(12) United States Patent
Bischoff et al.

(10) Patent No.: US 9,030,492 B2
(45) Date of Patent: May 12, 2015

(54) METHOD AND DEVICE FOR DETERMINING OPTICAL OVERLAPS WITH AR OBJECTS

(75) Inventors: Rainer Bischoff, Augsburg (DE); Arif Kazi, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 1309 days.

(21) Appl. No.: 11/817,571

(22) PCT Filed: Feb. 25, 2006

(86) PCT No.: PCT/EP2006/001753
§ 371 (c)(1),
(2), (4) Date: Aug. 31, 2007

(87) PCT Pub. No.: WO2006/092251
PCT Pub. Date: Sep. 8, 2006

(65) Prior Publication Data
US 2008/0150965 A1  Jun. 26, 2008

(30) Foreign Application Priority Data
Mar. 2, 2005 (DE) .......................... 10 2005 009 437

(51) Int. Cl.
*G09G 5/00* (2006.01)
*G06T 15/20* (2011.01)
*G02B 27/01* (2006.01)
(Continued)

(52) U.S. Cl.
CPC ................ *G06T 15/20* (2013.01); *G02B 27/01* (2013.01); *G02B 27/0101* (2013.01); *G02B 2027/0127* (2013.01); *G02B 2027/0138* (2013.01);
(Continued)

(58) Field of Classification Search
CPC .............................. G06T 15/20; G06T 19/006
USPC ................ 345/418–427, 632, 633, 634, 629; 382/100, 132, 312
See application file for complete search history.

(56) References Cited

U.S. PATENT DOCUMENTS 5,297,238 A * 3/1994 Wang et al. ................... 700/259
6,503,195 B1    1/2003 Keller et al.
(Continued)

FOREIGN PATENT DOCUMENTS

DE          101 28 015 A1    12/2001
DE          103 05 384 A1     8/2004
WO           00/52536 A1      9/2000

OTHER PUBLICATIONS
European Patent Office; Search Report in International Patent Application No. PCT/EP2006/001753 dated Jun. 12, 2006.

*Primary Examiner* — Jin-Cheng Wang
(74) *Attorney, Agent, or Firm* — Wood, Herron & Evans, LLP

(57) ABSTRACT

A method for overlaying AR objects on an environmental image representing the environment includes recording a depth image of the environment from a point of vision; modifying the representation of an AR object to be placed in the environmental image in terms of how it appears from the point of vision at a pre-defined spot in the environmental image; determining how the parts of the AR object facing the point of vision are arranged in relation to an associated image point of the depth image, from the point of vision; modifying at least the representation of parts of the AR object in a pre-determined manner in relation to the apparent depth in the image; and overlaying the processed AR object on the environmental image. A device for overlaying AR objects on an environmental image displaying the environment operates according to the method steps.

19 Claims, 9 Drawing Sheets

(51) Int. Cl.
  *G06T 7/00*    (2006.01)
  *G06T 19/00*   (2011.01)

(52) U.S. Cl.
  CPC ........... *G02B2027/014* (2013.01); *G06T 7/004* (2013.01); *G06T 19/006* (2013.01)

(56) References Cited

U.S. PATENT DOCUMENTS

| | | | |
|---|---|---|---|
| 6,587,752 B1 * | 7/2003 | Saito | 700/264 |
| 6,763,284 B2 * | 7/2004 | Watanabe et al. | 700/264 |
| 7,818,091 B2 * | 10/2010 | Kazi et al. | 700/259 |
| 8,072,470 B2 * | 12/2011 | Marks | 345/632 |
| 2002/0082498 A1 | 6/2002 | Wendt et al. | |
| 2002/0123812 A1 * | 9/2002 | Jayaram et al. | 700/98 |
| 2002/0158873 A1 * | 10/2002 | Williamson | 345/427 |
| 2003/0012410 A1 | 1/2003 | Navab et al. | |
| 2003/0037449 A1 * | 2/2003 | Bani-Hashemi et al. | 33/286 |
| 2004/0077393 A1 * | 4/2004 | Kim et al. | 463/2 |
| 2004/0189631 A1 * | 9/2004 | Kazi et al. | 345/418 |
| 2004/0189675 A1 * | 9/2004 | Pretlove et al. | 345/633 |
| 2005/0093889 A1 * | 5/2005 | Sauer et al. | 345/633 |
| 2005/0179617 A1 * | 8/2005 | Matsui et al. | 345/7 |
| 2005/0231505 A1 * | 10/2005 | Kaye et al. | 345/421 |
| 2005/0256611 A1 * | 11/2005 | Pretlove et al. | 700/264 |
| 2008/0065243 A1 * | 3/2008 | Fallman et al. | 700/83 |

\* cited by examiner

METHOD AND DEVICE FOR DETERMINING OPTICAL OVERLAPS WITH AR OBJECTS

TECHNICAL FIELD

The invention concerns a method and a device for determining optical overlaps of a virtual image of a virtual object (AR object) and a real image of a real environment, in particular, for superimposing AR objects on an environmental image showing an environment.

BACKGROUND

The invention thus lies in the area of the so-called Augmented Reality (AR)—in German, enhanced or augmented reality as a visual overlapping (=enhancement) of the reality with virtual information. An AR object or an Augmented-Reality object is an object for which spatial information is available in a computer, primarily initially in a storage unit, and which is superimposed or overlaid on an environmental image of the environment after production of the image from this spatial information by rendering. The origin of the AR object—that is, the source of this defining spatial information—is not important; it can be produced or modeled in a purely mathematical manner; it can also be spatial information obtained from an actual real object.

In Augmented Reality, the reality or environment can be viewed either as a video image or through a transparent screen, onto which the overlaying of the AR object takes place. In the first case, one speaks of a "Video See-Through" (VST); in the second case, of an "Optical See-Through" (OST). In addition, there are other variants of the visualization, which do not differ substantially from these two types.

Augmented Reality can be employed and utilized in many diverse ways. Thus, a tool, such as welding tongs, or an AR object representing a workpiece can be overlaid in correct correlation on the image of a machine or a robot (here in the sense of ISO 8373), in order to see, in this way, for example, the movement space limited by the additional object (workpiece, tool). Coordinate systems for illustration and clarification of the correlation of these, relative to one another and to the machine or the robot, are overlaid. Text information, such as excerpts of operating instructions or the like, can also be overlaid.

SUMMARY

Below, independent of the type of visualization (VST, OST, or other types), an environmental image is spoken of when an AR object is to be made visible in this environmental image. In order to be able to overlay an AR object in an environmental image so that it is inserted seamlessly—that is, correct in position and overlap—in the environmental image, as exact as possible a model of the environment—also, designated as an overlap model—is needed. This is used to overlay the parts of an AR object which are not visible for an observer from a certain angle of vision to a scene.

There is the problem that models of robot cells only approximately agree with reality. The reason for this is to be found in the fact that robot cells cannot be constructed exactly according to plan, and in that during construction and startup of a unit, other changes take place which cannot be retouched in the model. As yet, there are no automated processes which reconcile the model and reality with one another.

Therefore, overlap models cannot imitate reality in all details. As a rule, with models of a (real) robot, the cable guidance cannot be imitated in the model. Nor is it possible to position overlap models with environmental models created by them that produce them exactly in the correct position, relative to the real world. Such calibration errors (also called recording errors) result in the AR objects being erroneously embedded in the environmental image. Errors can become visible in that parts of AR objects can be seen although they would necessarily be hidden, or that parts of AR objects cannot be seen although actually they would necessarily be seen.

The goal of the invention is to overlay AR objects in an environmental image correctly with respect to position and overlap, dynamically in real time, without the expense of production of overlap models.

In accordance with the invention, the so-called goal is attained with a process of the type mentioned in the beginning, which is characterized by the optical recording of image points of the real image from an observation pose, the determination of first depth positions for the image points of the real image relative to the observation pose, the creation of image points from a virtual image of the virtual object, set up on the basis of the pose of the virtual object and the observation pose, the calculation of the second depth positions for the image points of the virtual image, relative to the observation pose, and a comparison of the first depth positions with the second depth positions on the same optical axis of the observation pose. A preferred configuration of the process is characterized in that a depth image of the environment is recorded from a point of vision that the representation of an AR object to be placed in the environmental image is modified in terms of how it appears from the point of vision at a pre-defined spot in the environmental image, that for the parts of the AR objects facing the point of vision, a determination is made as to how these parts are arranged, seen from the point of vision, relative to an associated image point of the depth image—that is, the depth positions of the image points of the real image of the environment are compared with the depth positions of the image points of the produced AR object, that at least the representation of parts of the AR object is modified in relation to the apparent depth or depth position in the image such that image areas of the AR object which lie in the foreground are represented optically different from image areas of the AR object which lie in the background, and that the AR object thus processed is overlaid in the environmental image.

To attain the aforementioned goal, the invention also provides a generic apparatus, which is characterized by a recording device for optical recording of image points of the real image from an observation pose, a determination device for determination of first depth positions for the image points of the real image relative to the observation pose, a production device for production of image points from a virtual image of the virtual object, set up on the basis of the pose of the virtual object and the observation pose, a calculation device for calculation of second depth positions for the image points of the virtual image relative to the observation pose, and a comparison device for comparison of the first depth positions with the second depth positions on the same optical axis of the observation pose, wherein the apparatus is preferably made up of a recording device for recording a depth image of the environment from a point of vision, a representation device for representation of an AR object to be placed in the environmental image so that as it appears from the point of vision at a pre-defined spot in the environmental image, a determination device for determination of the parts of the AR object facing the point of vision so as to determine how these parts area arranged, seen from the point of vision, relative to an associated image section of the depth image—that is, for the comparison of the depth positions of the image points of vision of the real image of the environment with the depth positions of the image points of the produced AR object, a second representation device for representation of the parts of the AR object that lie, from the point of vision, behind a corresponding image section of the depth image, is modified [sic] such that image areas of the AR object which lie in the foreground are represented in a way that is visually different from image areas of the AR object which lie in the background, and an overlaying device for overlaying the AR object on the environmental image. The invention is in particular used with and in connection with robots.

The production of image points from a virtual image of the virtual object, set up on the basis of the pose of the virtual object and the observation pose, can take place by means of rendering—that is, the calculation or production of real images from spatial virtual computer models. A modification of the representation of an AR object, taking into consideration the point of vision of an observer, is to be understood to the effect that a (2D) image (AR object) for the actual observation point is calculated from a stored virtual (3D) object on the basis of the point of observation and the pose of the virtual (3D) object in the space. Depth position designates spacing of the recorded image points, calculated from the point of vision. The depth image of the environment [verb missing] the image points of a real image, wherein each image point is correlated with information regarding the distance of the image point from the observation point. The representation of the foreground is a representation which is interposed before a reference representation in its depth position and the background representation is to be defined as a representation which is placed after a reference representation in its depth position.

The core idea of the invention is to be able to dispense with a modeling of a real environment in that by means of an optical system, not only the image points of a view of the real environment, but also the distances of the recorded image points from the point of vision (depth positions) are recorded, in order to record depth information directly, together with digital image data—simultaneously, so to speak. By comparison of these depth positions of the image points of the real image with the depth positions of a virtual image, it is possible to make a conclusion regarding overlap areas. Such a conclusion is possible by a simple comparison of the depth positions of image points of the real image with the virtual image to be overlaid, without having to carry out complex calculations. From the omission of complex calculations is obtained the advantage that the process according to the invention has a real-time capability.

With a VST system, the point of vision is the location of the camera; with an OST system, it is the eye or the eyes of the observer, wherein a device for recording the depth image is to be placed close to the optical axis of the eye of the observer relative to the environment area lying in its field of vision, and optionally a coordinate transformation is to be undertaken between the location of the recording device for recording the depth image and the eye of the observer.

The aforementioned process preferably takes place in real time—that is, keeping pace with the changes in the real world, and the apparatus is designed for real time processing and works, in particular, in the real-time mode. By means of the invention, therefore, AR objects are dynamically overlaid in an environmental image and with the VST process, in particular, are correctly overlaid, while keeping pace, in a video image, with respect to position and overlap. According to the invention, this is achieved in that instead of the execution of a complex modeling process, the image-wide depth transformation is used directly for position- and overlap-correct processing of the AR objects. The required relation between the coordination system of the real object to which the AR object is to be correlated, for example, a robot coordinate system and the camera coordination system can be determined by calibration in the usual manner. Subsequently, the known pose of the AR object in the space is transformed by means of a known transformation rule into the camera coordinate system and then into the image plane. In this way, one can ascertain directly, with regard to the measured depth image, which parts of an AR object are to be represented and in which way an AR object is to be represented according to prespecified overlap rules.

For recording the depth image, one can basically consider methods such as transit time measurements (Time of Flight—TOF), laser scanning, active triangulation, stereovision, distance determination by defocusing, structure illumination, Moire technology, in particular, however, a process in which illumination in an environment lying the in field of vision of the observer is performed in a very short time by means of a light curtain, for example, according to U.S. Pat. No. 4,184,748, and the light reflected from the surroundings is likewise processed in very short time intervals in the nanosecond range, for example, interrupted by (electro-optical) shadow stops, for setting up the depth image. It is essential that the process work very quickly—that is, have real-time capability.

If the site and orientation of a computer-generated, artificial object to be represented on a screen are known, then it is the usual technique of graphics or image processing to process the object as a model or spatial information in a manner as it will be represented on the screen for the observer, who upon reproduction sees the points of an object facing him but not the points "concealed" by the object itself.

For processing the AR object in a prespecified manner, processing rules can be provided and, for example, filed in the computer, as, for example, in a preferred manner to the effect that the points of the AR object, as, for example, of welding tongs mounted on the hand flange of a robot which from the point of vision lie behind a corresponding image point of the depth image—that is, for example, are overlaid behind areas of the robot hand, from an AR object overlaid in the environmental image, here, the welding tongs. Also, as a function of distance to a boundary of a physical object in the environmental image, certain features of an AR object can change in the representation, such as transparency or color of the AR object, thickness of the lines, type of lines, wire grid, or full-surface model representation. Thus, the points of the AR object, such as of a coordinate system, which from the point of vision lie behind a corresponding image point of the depth image, such as "in the interior" of robot parts, are represented in the environmental image as a grid image or as a broken line or as a dash and dot line. This is true also if, for example, gear parts of a gear as an AR object in fact "lie" behind a gear housing cover, but nevertheless should be visible in the AR image.

In an alternative, preferred configuration, provision can be made so that the environmental image is reproduced as a video image and the AR object is overlaid in the video image (VST), or that the environmental image can be viewed directly through a transparent screen and the AR object in the transparent screen is overlaid on the environmental image which can be observed through it (OST).

In a correspondingly preferred configuration of the apparatus, a display device for the display of the AR object, within the framework of VST, is a traditional screen also showing the recorded environmental image, or the display device for the display of the AR object is a transparent screen that allows the environmental image to pass through. A retinal display is provided in accordance with an alternative configuration of the invention.

If the recording device to record a depth image is a depth image camera in the manner outlined above, then a preferred configuration provides for it to be combined with a video camera.

The invention can be used for modeling virtual or AR objects according to real objects. Thus, an envelope which has several support points can be adapted to the contour of the real object to be modeled. Also, parameters of existing models can be adapted such that they agree better with reality. An interactively determined, simplified model of a complex tool or a whole cell can subsequently be used, for example, for a collision avoidance calculation. It is precisely in the interaction of humans with virtual objects in the real world that the advantages of the object of the invention become obvious during visualization.

Other advantages and features of the invention can be deduced from the claims and from the subsequent description, in which embodiments of the invention are explained in detail, with reference to the drawings.

DETAILED DESCRIPTION

Figure 1:
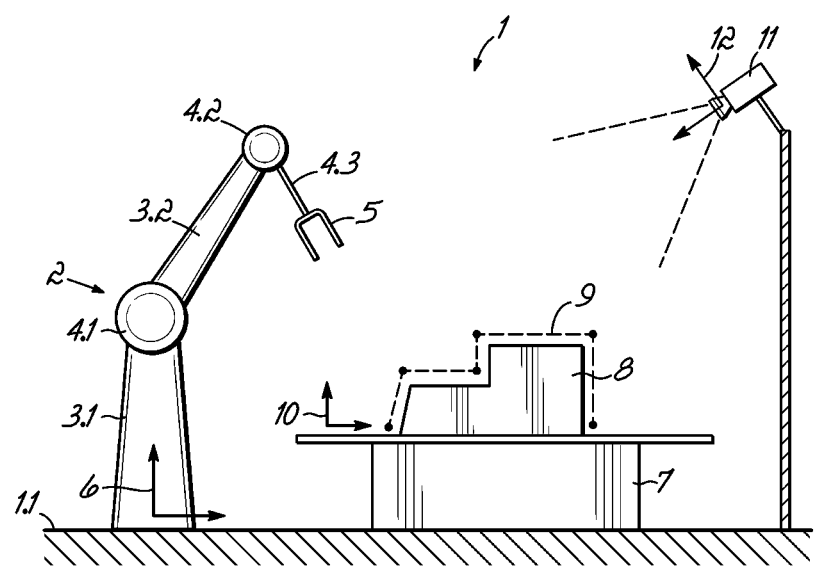
FIG. 1, a schematic representation of the situation for AR visualization with a stationary camera, which gives both a depth image and also a normal video image for a VST visualization.

FIG. 1 shows, in schematic representation, the typical situation in a robot processing cell 1. An articulated robot is schematically shown, in accordance with EN ISO 8373, with members 3.1, 3.2, and joints 4.1, 4.2. The joint 4.2 is a rotoid member, consisting of three individual rotating members, on which a mechanical interface 4.1 [sic; 4.3] and an end-effector connecting device (connecting flange of the robot 2 for an end effector, such as a gripper 5) are located. Furthermore, the robot's world coordinate system or robot coordinate system 6 is shown at the foot of the robot 2. FIG. 1 also shows a workpiece 8, situated on a workpiece table 7, and a robot path 9 leading around it, with support points and with a schematic representation of the programmed base or reference coordinate system 10, belonging to this.

Finally, a stationary camera 11, preferably a 3D camera, with its camera coordinate system 12, is shown recording the scene or environment formed of robot 2 on a base mounting surface 1.1 and workpiece 8.

The camera records both a traditional visual video image and also a depth image of the shown environment 1, wherein from the determination of the spatial relation between the robot and the camera coordinate system, the transformation is effected as a prerequisite for AR visualization of an AR object in the image recorded by the camera 11.

Figure 2A:
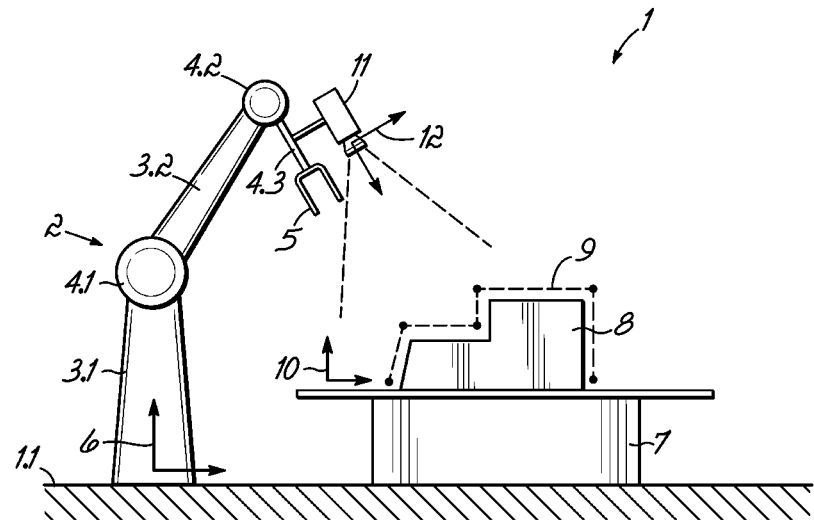
FIG. 2A, a representation of a situation for AR visualization with a depth image camera, moved along with a robot.

FIG. 2A shows the same scene or environment, wherein the same parts are designated with the same reference symbols and where with respect to the description of FIG. 2, reference is also made to FIG. 1. In the embodiment of FIG. 2, the camera 11 is not stationary, but rather is located on the robot, more precisely on the mechanical interface 4.3 or the hand of the robot, so that the camera coordinate system can move with it.

The advantage of this configuration, in comparison to that in FIG. 1, lies in the fact that the robot 2 itself provides the pose of the camera 11 needed for the AR visualization, in space and with reference to the robot coordinate system 6, wherein reference is made with regard to the aforementioned relation to Patent Application DE 103 45 743.7. In this manner, without external tracking and without model formation, a believable AR visualization is possible, which can be implemented very simply.

Figure 2B:
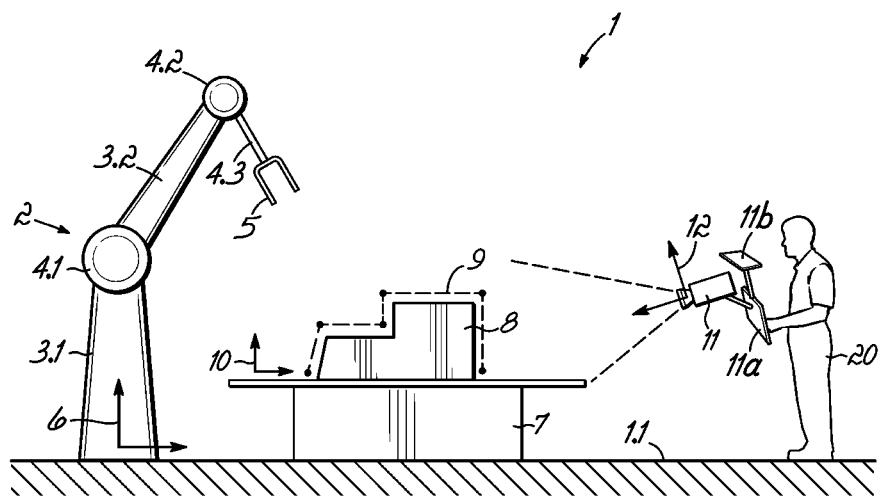
FIG. 2B, a schematic representation of the situation of an AR visualization with the aid of a depth image camera for the VST-AR visualization, moved along by the user.

In the configuration of FIG. 2B, the camera 11, in a fixed relation to a user, is firmly connected to him. The user has a viewing device 11a, in the form of a screen, on which the environment and the AR objects are overlaid. Furthermore, a tracking aid 11b is provided by means of which the changing position of the user relative to the rest of the environment, and in particular to the robot, can be determined.

Figure 3:
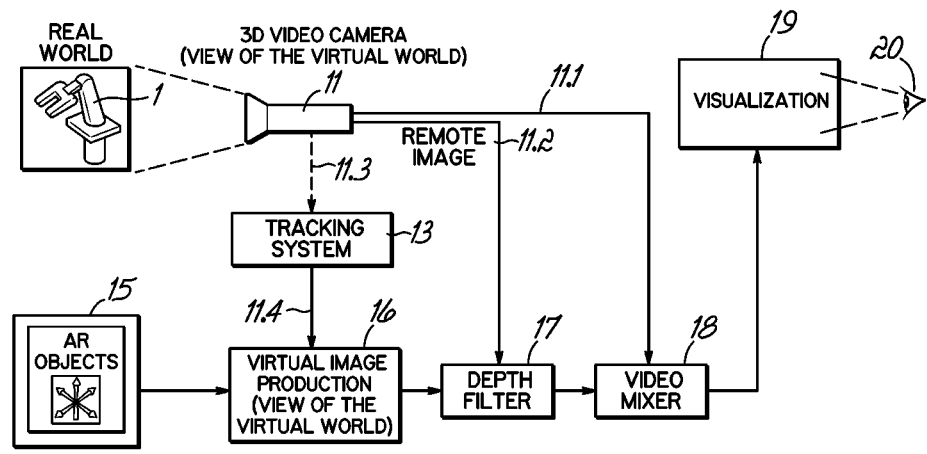
FIG. 3, a schematic representation of the functional principle of the invention for a VST-AR system.

In a schematic representation, FIG. 3 shows a preferred configuration of an apparatus for AR visualization as a VST-AR system.

The apparatus has a 3D video camera 11—consisting of a traditional visual video camera and a depth image camera—which gives both a video image 11.1 and also a remote image 11.2 and optionally, tracking information 11.4. As a system for determining and monitoring the position and rotation of the 3D video camera, a tracking system 13 is provided which can optionally work with the image information recorded by the camera 11 (including, in particular, that the depth image).

The camera 11 records a real-world image, of the environment 1 lying in its field of vision, for example, of the robot 2 of FIG. 1.

The apparatus in accordance with the invention also has an inventory—in memories or on its own storage media—of AR objects 15. Furthermore, a processing device 16, for processing at least one AR object to be placed in the environmental image, is provided such that the object appears, from the point of vision, at a pre-determined spot in the environmental image 14, by means of which, therefore, a virtual image production is effected as a view of the virtual world (the AR object). This is followed by a depth filter 17, a video mixer 18, and a reproduction device 19, in the form of a screen, on which the observer 20 can observe the overlaid environmental image and AR object.

First, a video image and a depth image are recorded simultaneously. Furthermore, the AR objects 15 are processed in the device 16 such that they appear correct in size and position. Each such processed AR object is, just like the depth image 11.3, supplied to the depth image filter 17 as a possible enhancement of a processing device for processing the points of the AR object, wherein the aforementioned (and explained below, in more detail) processing operations can be undertaken on the AR object, such as masking out of areas, representation in broken lines, or the like. Each such further processed AR object 15 is, just like the video image 11.1, supplied to the video mixer 18 as an overlaying device for overlaying the AR objects in the environmental image, and the image mixed in this way is supplied to the monitor or the screen 19 so that the observer can see this AR image with superimposition of the real environment and at least one AR object.

The processing and insertion of the AR object in the environmental image are depicted in detail with the aid of FIGS. 4A-4D and 5A-5C.

Figure 4A:
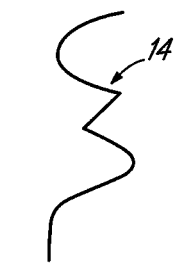
FIG. 4A-4D, a schematic illustration of the processing of a virtual object for position- and overlap-correct overlaying as an AR object in the area of the environmental image of a real body.
Figure 4B:
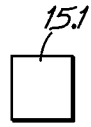
Figure 4C:
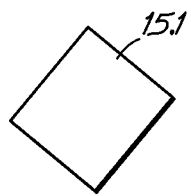
Figure 4D:
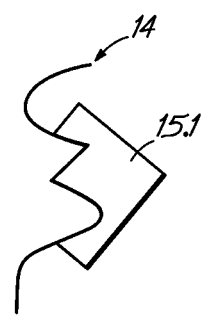

FIG. 4A shows schematically an intersecting line through a point cloud, included by an envelope surface, in a depth image of the environment (real object 14). FIG. 4B shows, in a schematic manner, an AR object 15.1 as such, in the form of a square. FIG. 4C shows how the AR object of FIG. 4B is changed for the insertion into the environmental image of FIG. 4A, with respect to its size and its orientation (position)—that is, is enlarged concretely here and rotated. FIG. 4D then shows the overlaying of an environmental image of the real object and of the AR object, wherein parts of the AR object in the field of vision—top view on the sheet plane—which lie behind the real object 14, are hidden and are not depicted—that is, are not visible for the observer—as can be seen in FIG. 4D; the AR object appears to lie behind the real object 14.

Figure 5A:
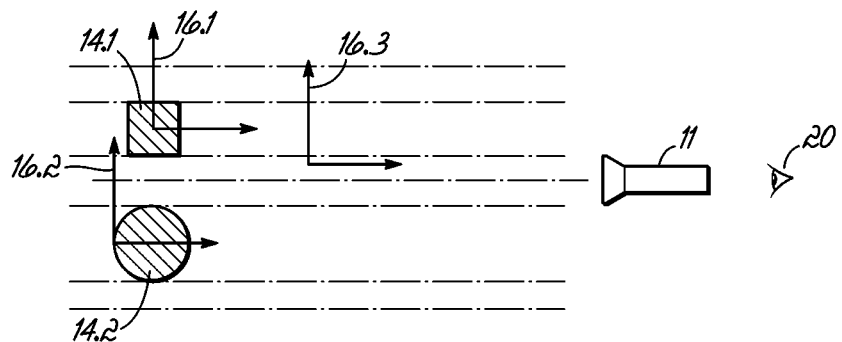
FIG. 5A-5C, the illustration of the overlaying of a coordinate system as an AR object in an environmental image, taking into consideration the point of vision and the actually present objects partially blocking the view of the AR object, under different viewing angles.
Figure 5B:
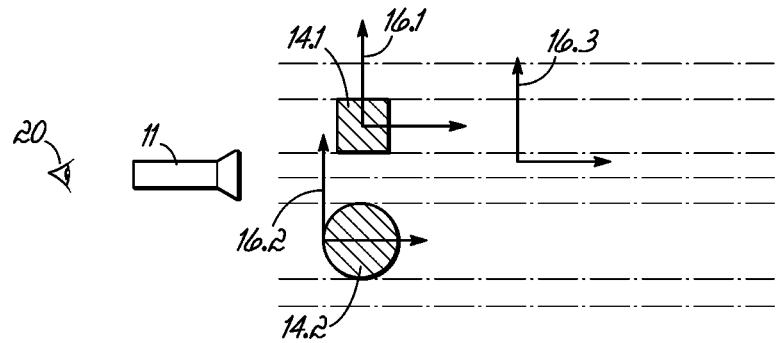
Figure 5C:
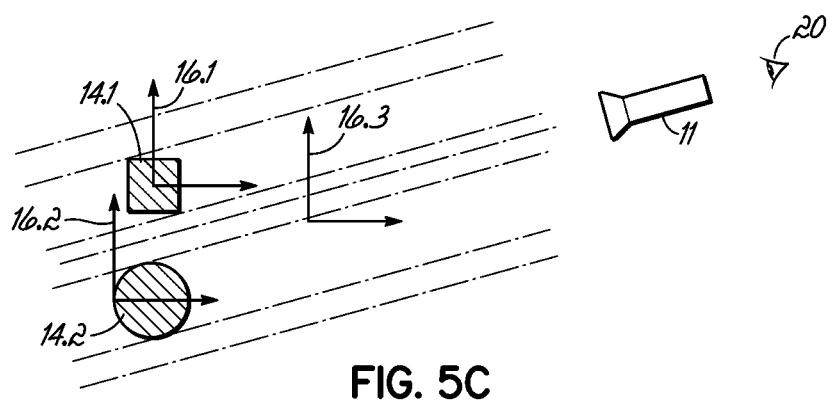

This is shown in FIGS. 5A-5C with the aid of two simple real objects 14.1 and 14.2 in the form of a square and a circle and of coordinate systems 16.1, 16.2, 16.3 as an AR object 16. The coordinate system 16.1 lies in the center of the object 14.1 and in the overlap area of the two, the coordinate system 16.1 is depicted as a broken line to the observer. Furthermore, the coordinate system 16.2 lies in FIG. 5A, by way of example, on the outermost left point of the circular object 14.2. The horizontal axis is also depicted as a broken line in the area of the overlap with object 14.2, just like that area of the vertical axis that lies behind the object 14.2 out of the line of vision of the camera 11 and also the tip of the vertical axis of the coordinate system 16.2, in the line of vision lying behind object 16.1.

An AR object in the form of the coordinate system 16.3, lying in front of both objects, is represented completely and unchanged, in this direction of vision.

FIG. 5B shows an observation of the object 14.1, 14.2 from the direction of vision that is opposite relative to FIG. 5A. Here, from the AR object 16.1, the vertical axis in the overlap area with object 14.1 is shown, as a broken line, and the horizontal axis, lying in the line of vision of the camera 11 within or behind the object, is shown entirely as a broken line. The coordinate system 16.3 lying behind the object 14.1 is shown as a broken line in the area where it is not visible from the direction of vision of the camera 11 of FIG. 5B—that is, in a partial area of the vertical axis. In coordinate system 16.2, the vertical axis is completely visible as a result of the position of the origin, whereas the horizontal axis is depicted as a broken line.

In the configuration of FIG. 5C, a modification of FIG. 5A is shown at a finite angle relative to the horizontal axis of the coordinate systems. The objects 16.1 and 16.2 are visible in a manner similar to the example of FIG. 5A. Something corresponding applies for the horizontal axis of the object 16.2, whereas as a result of the different angle of vision, the vertical axis is covered by the object 14.2 for only a shortened area and is therefore depicted in a broken line; in its upper area, however, it is extensively covered by the object 14.1 and therefore is represented in a broken line for a greater length.

Figure 6:
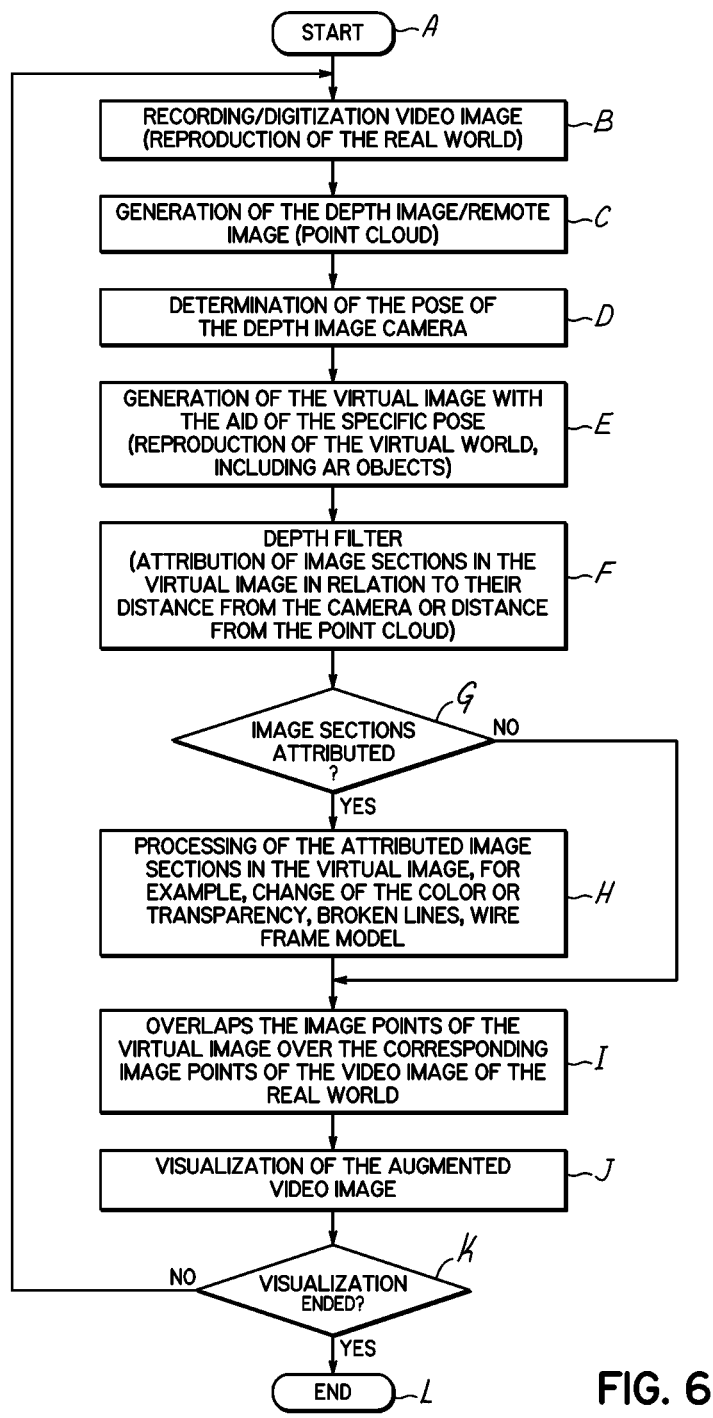
FIG. 6, the flow of the process according to the invention, with a VST visualization.

FIG. 6 shows a possible flow diagram for the process in accordance with the invention, in a VST visualization. The steps represented in the diagram and subsequently taking place sequentially can in part also take place parallelized—that is, simultaneously.

After the start A, in step B recording and digitization of the video recording take place as a representation of the real world. In step C, which can take place parallel to step B, the generation of a depth image (also called remote image or point cloud) takes place within the framework of recording by the depth image camera. In another step D, a determination of the pose (position and orientation) of the depth image camera takes place optionally. Step D can optionally also take place parallel to steps B and C if the tracking information is supplied by an external sensor system. Subsequently, in step E, an AR object, to be placed in the environmental image, is processed as it appears from the point of vision of the camera, at a pre-determined spot in the environmental image. The generation of the AR image, therefore, takes place with the aid of the pose determined in the preceding step—that is, of a representation of the virtual world. When this has occurred, at least the points of the AR object which lie, from the point of vision, behind an associated image point of the depth image of the real world are processed in a prespecified manner in that, for example, image sections are attributed in the AR image that lie, from the view of the depth image camera, behind the generated point cloud (of the real environmental image) (Step F). Image sections or image points are provided with attributes by the depth filter. The attributes are typically in relation to the distance of the image sections or points from the camera or the depth profile. In the event that such image sections are attributed (decision step G), processing of the characterized image sections takes place in the AR image, for example, by changing the color, the transparency, sketching in a broken line, hiding, or the like (step H). Steps G and H are run through for all points of an image—that is, it is checked whether each image section/pixel has received an attribute by the depth filter. If yes, the pixel is changed in accordance with the attribute (color, transparency, and so forth); if no, processing continues for the next image section/pixel.

In another step (step I), the image points of the AR image are then superimposed over the corresponding image points of the video image of the real world and finally, in step J, there is a visualization of the augmented video image. If this process is to occur with the next video image produced by the video camera, then a return to step B (decision step K) and processing of the next image in the described manner take place—otherwise, the process flow ends (step L).

Figure 7:
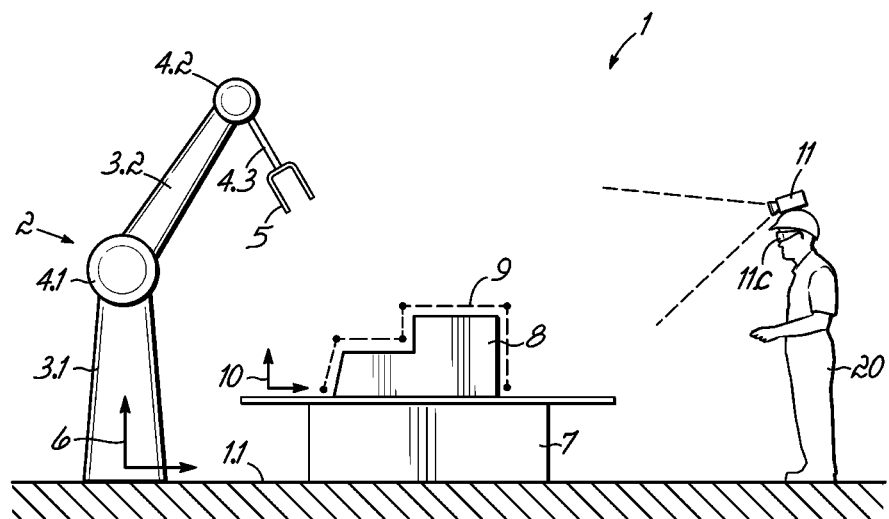
FIG. 7, a schematic representation of the OST-AR visualization with the aid of a 3D camera, which is integrated in AR glasses and moves along with the user's head movements.

With OST visualization, the unneeded steps B and I are essentially omitted, whereas otherwise, the flow is largely the same, wherein step J provides a visualization of the AR objects by overlaying the virtual image in the field of vision of the observer, as is illustrated in FIG. 7.

Figure 8:
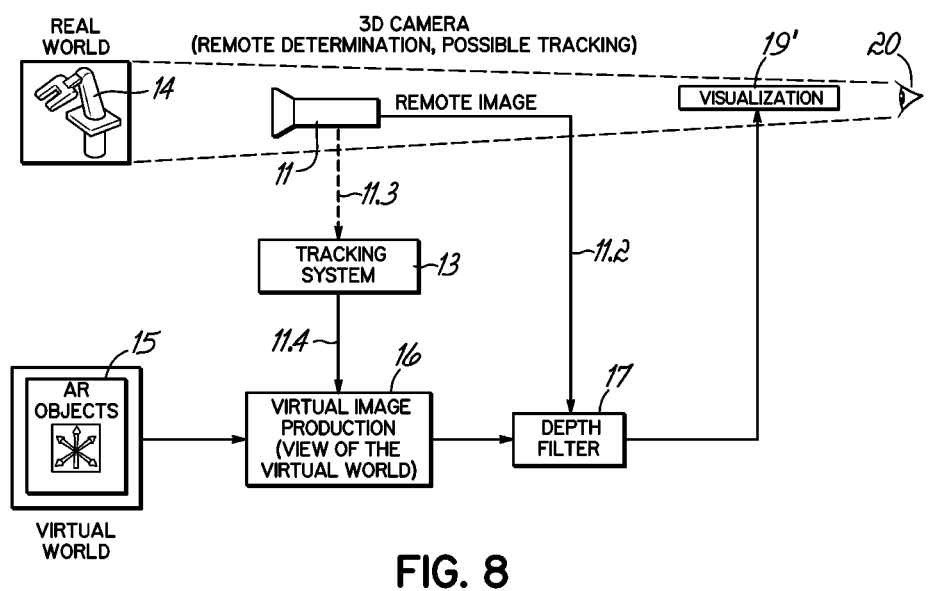
FIG. 8, a schematic representation of the object of the invention for an OST-AR system.
Figure 9:
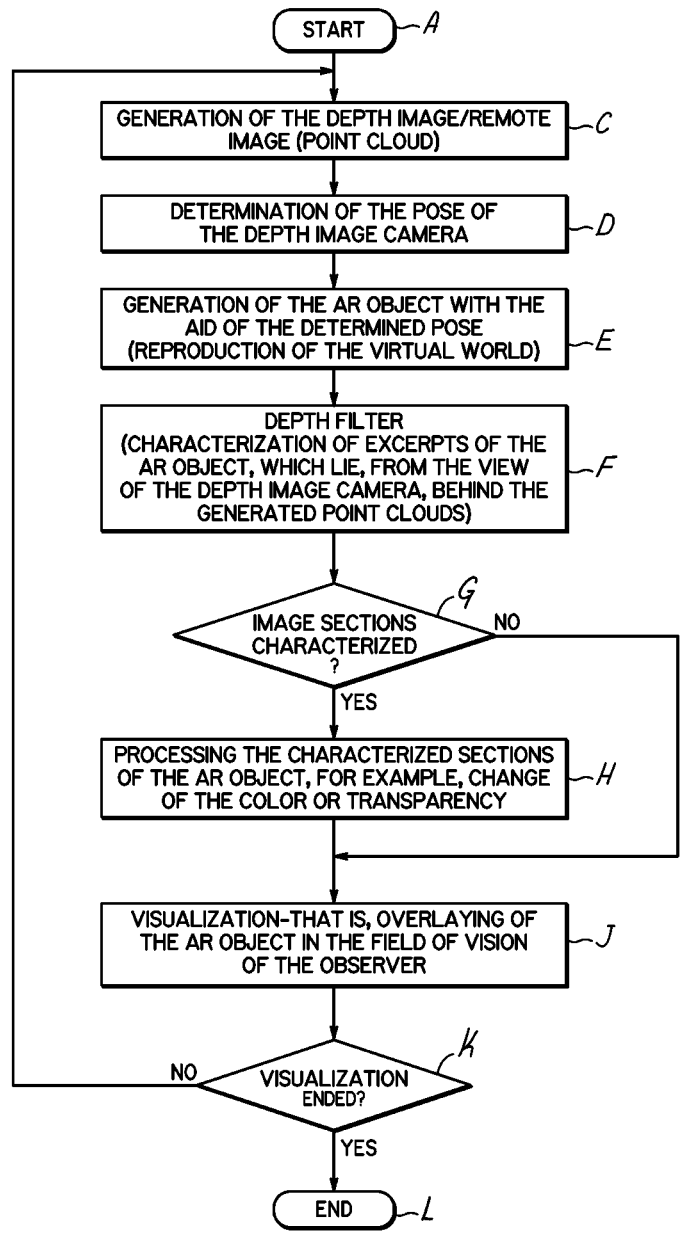
FIG. 9, a flow chart of the process according to the invention, in an OST visualization.

FIGS. 7-9 explain the object of the invention for an OST Augmented Reality System. The same parts are again provided with the same reference symbols. If, in comparison to the configuration of FIGS. 1-3, in particular 6, no changes are produced, reference is made to the statements there in order to avoid repetitions.

In the configuration of FIG. 7, the camera 11 is in a fixed relation to a user and is firmly connected to him. There is a retinal display 11c, by means of which the AR image is projected onto the retina of the observer, and this is overlaid on the real environment seen by the observer.

FIG. 8 again shows a scene of the real world (environment) that is recorded by a camera 11, which can then be a pure depth image camera. In the same way, the AR object 15 present is adapted to the recorded depth image 11.3 with the aid of a tracking system 13 used for continuous determination of the pose, and then is overlaid on the partly transparent screen 19', as a viewing device, into the field of vision of the observer 20, who directly views the scene 14 only through the transparent screen, so that the adapted AR object appears at the right spot and in the right representation in the environmental image seen by the observer.

Also, the process flow represented in FIG. 9 basically corresponds to that for the VST visualization except for the changes provided by the OST observation, so that in this respect also, reference can be made basically to the explanations of FIG. 6.

Step B of the VST process course for recording and digitization of a video image is not required, since, as was said, in the OST visualization the observer observes the scene or environment directly or through a transparent screen, and not via a monitor. Correspondingly, step I of overlaying the image points of the virtual image over the associated image of points of the video image of the real world is also omitted. Only a visualization takes place—that is, an overlaying of the AR image in the field of vision of the observer (step J'). Otherwise, the process steps correspond to those of FIG. 6 for the VST visualization.

The process in accordance with the invention, and the apparatus in accordance with the invention, can be used advantageously for the modeling of a real object as a virtual or AR object, as is explained below with reference to FIGS. 10A-10G.

Figure 10A:
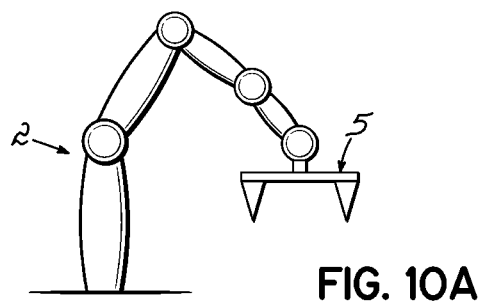
FIG. 10A-10G, a representation for the interactive modeling of a robot gripper in the augmented world.
Figure 10B:
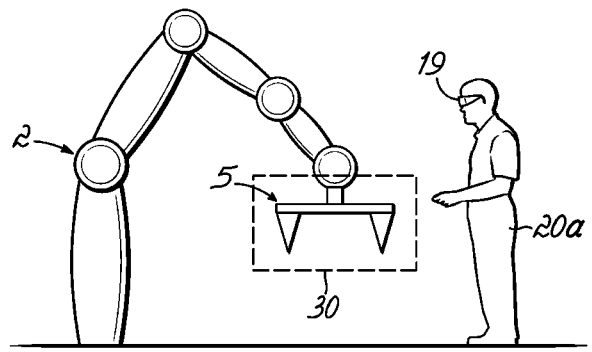
Figure 10C:
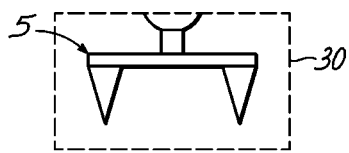
Figure 10D:
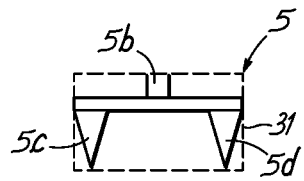
Figure 10E:
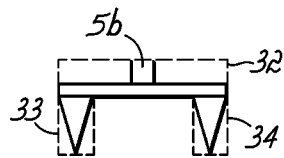
Figure 10F:
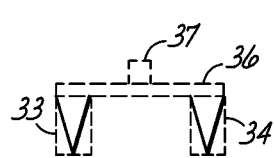
Figure 10G:
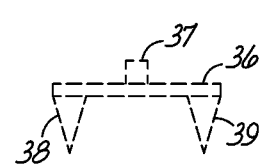

A robot tool, such as welding tongs or, below, a gripper, are modeled on site with the aid of small elementary geometries, such as cubes, spheres, and so forth, in that the elementary geometries are gradually positioned by a person in the augmented reality. FIG. 10A initially shows a robot 2 with a (real) gripper 5. FIG. 10B also depicts a person 20a who wears glasses on which AR objects are overlaid. By means of an operating device, which is not depicted here, the person 20a then creates an AR object in the form of a rectangular parallelepiped-like frame 30 around the gripper 5—here depicted only two-dimensionally as a rectangular frame, using broken lines. The further modeling which the operator 20a undertakes in order to create a virtual or AR object which is adapted to the actual, real gripper 5 as accurately as possible, is depicted in FIGS. 10C to 10G, wherein FIG. 10C shows, once more, the rectangular parallelepiped 30 around the real gripper 5. The frame 30 is first diminished to form a rectangular parallelepiped 31, which envelops the real object—the gripper 5—to its limits. Subsequently, another approximation takes place in that smaller rectangular parallelepipeds are formed, which, on the one hand, surround the cross-beam 5a and the connecting plate 5b, and on the other hand, a gripper arm 5c, 5d (FIG. 10E). Then, the rectangular parallelepiped 32 is split up into a rectangular parallelepiped 36, reproducing the cross-beam, and a rectangular parallelepiped 37 reproducing the connecting plate (FIG. 10F). Finally, the tapered gripper arms 5b, 5c can be reproduced by corresponding geometrical FIGS. 38, 39. The AR object thus formed is then filed (stored) and can be used for visualization, collision avoidance, simulation, and the like in later applications.

Figure 11:
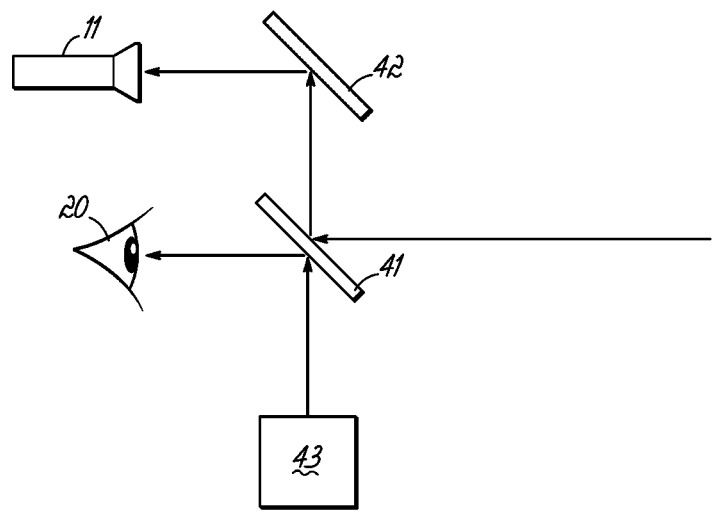
FIG. 11, an exemplary apparatus for Video-See-Through (VST-) visualization with a 3D camera, which records both a depth image and also the image of the environment.
Figure 12:
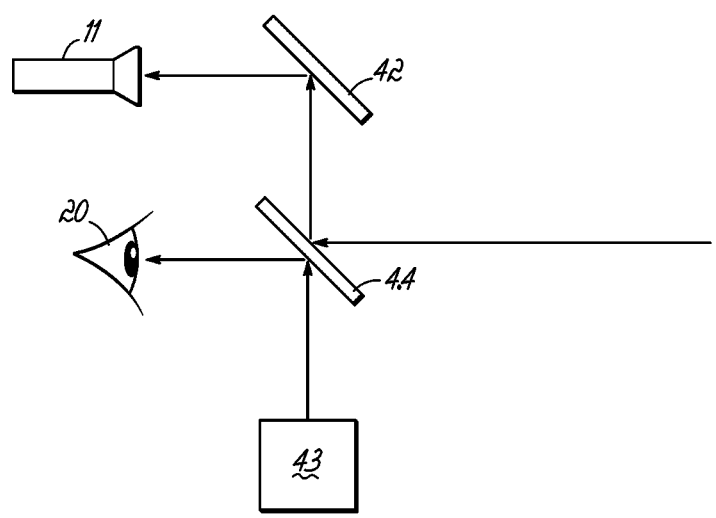
FIG. 12, an exemplary apparatus for Optical-See-Through (OST) visualization with a 3D camera, by which only the depth image is evaluated.

FIGS. 11 and 12 show exemplary (idealized) VST and OST visualization apparatuses. Both apparatuses could be designated as "AR glasses." Ideally, the point of vision of the human observer and the point of vision of the 3D camera coincide (here, realized by mirrors). In FIG. 11, a mirror 41 is located in the field of vision of the observer 20 in a double drawing; by means of the mirror, on the one hand—and via another mirror 42—the environmental image is directed to the camera 11 and on the other hand, the entire image—a real and an AR image—is projected before a projector and thus can be seen by the observer 20.

In the configuration of FIG. 12, a half-silvered mirror 44 is located in the field of vision of the observer 20, via which—and in turn, via a mirror 42—the environmental image is directed onto a depth image camera 11, and by means of which the observer 20 can observe the environment. Furthermore, the AR image of the projector 43 is directed by the mirror 44 into the field of vision of the observer 20, and is thus overlaid with the (real) environment he sees.

REFERENCE SYMBOL LIST

1 Robot processing cell
1.1 Base mounting surface
1 Surroundings
2 Robot
3.1, 3.2 Member
4.1 Joints
4.1 Interface
4.2 Joint
4.3 Interface
5 Gripper
5a Cross-beam
5b Connecting plate
5c, 5d Gripper arm
6 Robot coordinate system
7 Workpiece table
8 Workpiece
9 Robot path
9 Coordinate system
10 Camera
11a Viewing device
11b Tracking aid
11c Retinal display
11.1 Video image
11.2 Remote image
11.3 Depth image
11.4 Tracking information
12 Camera coordinate system
13 Tracking system
14, 14.1, 14.2 Object
15 AR objects
15.1 AR object
16 Processing device
16.1, 16.2, 16.3 Coordinate system as an AR object
17 Depth image filter
18 Video mixer
19 Reproduction device
19' Screen, AR glasses
20 Observer
20a Person 30 Frame
31-34 Rectangular parallelepiped
36, 37 Rectangular parallelepiped
38, 39 Geometric FIGS.
41, 42, 44 Mirror
43 Projector

What is claimed is:

1. A method for the determination of optical overlaps of a virtual image of a virtual object and a real image of a real environment, the method comprising:
   optically recording image points of the real image from an observation pose utilizing an optical recording apparatus;
   determining first depth positions for the image points of the real image with reference to the observation pose;
   creating image points from the virtual image of the virtual object based on a pose of the virtual object and the observation pose;
   calculating second depth positions for the image points of the virtual image with reference to the observation pose;
   comparing the first depth positions with the second depth positions along an optical axis of the observation pose;
   visually depicting a first portion of the virtual object that lies behind and would otherwise be hidden by a corresponding image area of the real image relative to the observation pose, wherein the first portion of the virtual object that lies behind the corresponding image area of the real image is visually depicted differently from a second portion of the virtual object that does not lie behind the corresponding image area of the real image; and
   visually representing the first portion or the second portion of the virtual object as a function of its depth position relative to the corresponding depth position of the corresponding image area of the real image.

2. The method of claim 1, wherein visually depicting the first portion of the virtual object further comprises:
   creating a foreground representation by optically overlaying in a graphic representation of the real environment image points of the virtual image having depth positions that are less than the depth positions of the image points of the real image.

3. The method of claim 2, further comprising:
   creating a background representation by optically overlaying in the graphic representation of the real environment image points of the virtual image having depth positions that are greater than the depth positions of the image points of the real image.

4. The method of claim 1, further comprising:
   optically recording depth positions for the image points of the real image using a red-green-blue-depth (RGBD) camera.

5. The method of claim 4, wherein optically recording the depth positions of the image points of the real image occurs simultaneously with optically recording the image points of the real image.

6. A method of overlaying a virtual object in an environmental image showing an environment, the method comprising:
   recording a depth image of the environment from a point of vision utilizing an optical recording apparatus;
   modifying a representation of the virtual object to be placed in the environmental image with respect to how the virtual object appears from the point of vision at a predetermined spot in the depth image of the environment;
   determining how parts of the virtual object that face the point of vision are arranged relative to an associated image point of the depth image of the environment by comparing depth positions of the image points of the depth image of the environment with depth positions of the image points of the virtual object;
   modifying at least parts of the representation of the virtual object relative to the apparent depth or depth position in the depth image of the environment such that image areas of the virtual object that lie in the foreground are visibly depicted in a way that is visually different from image areas of the virtual object that lie in the background;
   visually representing the image areas of the virtual object that lie in the foreground or the background as a function of its depth position relative to the corresponding depth position of the depth image of the environment; and
   overlaying the modified representation of the virtual object on the environmental image.

7. The method of claim 6, further comprising:
   depicting in a prespecified manner parts of the virtual object that lie behind and would otherwise be hidden by a corresponding image area of the depth image of the environment relative to the point of vision.

8. The method of claim 7, wherein parts of the virtual object that lie behind the corresponding image area of the depth image of the environment are depicted in the depth image as at least one of:
   a) a wireframe model,
   b) broken lines,
   c) a series of dashes and dots, or
   d) a representation of the virtual object that is changed in transparency or color.

9. The method of claim 6, wherein the depth image of the environment is reproduced as a video image and the virtual object is overlaid in the video image.

10. The method of claim 6, further comprising:
    observing the depth image of the environment directly through a transparent screen; and
    overlaying the virtual object on the transparent screen.

11. The method of claim 6, wherein overlaying the virtual object in the environmental image includes overlaying the virtual object as one of:
    a) a continuous video data flow in real time,
    b) individual images, or
    c) still images.

12. An apparatus for determining optical overlays of a virtual image of a virtual object and a real image of a real environment, the apparatus comprising:
    a recording device configured to optically record image points of the real image from an observation pose;
    a determination device configured to determine first depth positions for the image points of the real image relative to the observation pose;
    a production device configured to produce image points from the virtual image of the virtual object based on a pose of the virtual object and the observation pose;
    a calculation device configured to calculate second depth positions of the image points of the virtual image relative to the observation pose;
    a comparison device configured to compare the first depth positions with the second depth positions along an optical axis of the observation pose; and
    a representation device configured to visually depict a first portion of the virtual object that lies behind and would otherwise be hidden by a corresponding image area of the real image relative to the observation pose, wherein the first portion of the virtual object that lies behind the corresponding image area of the real image is visually depicted in an alternative manner relative to a second portion of the virtual object that does not lie behind the corresponding image area of the real image;

wherein said representation device is configured to visually represent the first portion or the second portion of the virtual object as a function of its depth position relative to the corresponding depth position of the corresponding image area of the real image.

13. The apparatus of claim 12, further comprising:

an overlaying device configured to overlay in a graphic representation of the real environment image points of the virtual image that have depth positions that are less than the depth positions of the image points of the real image to create a foreground representation.

14. The apparatus of claim 12, further comprising:

a mixing device configured to overlay in a graphic representation of the real environment image points of the virtual image that have depth positions that are greater than the depth positions of the image points of the real image to create a background representation.

15. The apparatus of claim 12, wherein the recording device and the determination device comprise a red-green-blue-depth (RGBD) camera configured to optically record the first depth positions simultaneously with recording the image points of the real image.

16. An apparatus for overlaying a virtual object in an environmental image showing an environment, the apparatus comprising:

a recording device configured to record a depth image of the environment from a point of vision;

a representation device configured to represent the virtual object to be placed in the environmental image so that the virtual object appears from the point of vision to be at a predetermined spot in the environmental image;

a determination device configured to determine how parts of the virtual object that face the point of vision are arranged relative to an associated image point of the depth image of the environment by comparing depth positions of image points of the depth image of the environment with depth positions of image points of the virtual object;

a second representation device configured to represent parts of the virtual object that lie behind a corresponding image section of the depth image, as seen from the point of vision, in a modified representation such that image areas of the virtual object that lie in the foreground are visibly depicted in a way that is visually different from image areas of the virtual object that lie in the background;

wherein said second representation device is configured to visually represent the image areas of the virtual object that lie in the foreground or the background as a function of its depth position relative to the corresponding depth position of the depth image of the environment; and an overlaying device configured to overlay the virtual object on the environmental image.

17. The apparatus of claim 16, wherein the recording device comprises a laser scanner.

18. The apparatus of claim 16, wherein the recording device comprises a depth image camera.

19. The apparatus of claim 16, further comprising:

a display device configured to display the virtual object, the display device being one of:

a) a video display screen that also displays the environmental image;

b) a transparent screen that permits the environmental image to pass through it; or c) a retinal display.

\* \* \* \* \*